US008096925B2

(12) United States Patent
Radding et al.

(10) Patent No.: US 8,096,925 B2
(45) Date of Patent: Jan. 17, 2012

(54) TREADMILL BELT WITH FOAMED CUSHION LAYER AND METHOD OF MAKING

(75) Inventors: Peter E. Radding, Wake Forest, NC (US); Steven Wayne Mutch, Rocky Mount, NC (US)

(73) Assignee: Veyance Technologies, Inc., Fairlawn, OH (US)

( * ) Notice: Subject to any disclaimer, the term of this patent is extended or adjusted under 35 U.S.C. 154(b) by 200 days.

(21) Appl. No.: 11/970,870

(22) Filed: Jan. 8, 2008

(65) Prior Publication Data
US 2009/0176628 A1    Jul. 9, 2009

(51) Int. Cl.
 A63B 22/02    (2006.01)
 F16G 1/00    (2006.01)
(52) U.S. Cl. .......... 482/54; 474/237; 474/254; 474/264; 474/268; 474/271; 264/41
(58) Field of Classification Search .................. 474/237, 474/254, 264, 268, 271; 264/45.9, 46.4, 264/46.5, 51, 54; 156/78, 308.2, 157, 218
See application file for complete search history.

(56) References Cited

U.S. PATENT DOCUMENTS

| 3,059,312 A | * | 10/1962 | Jamieson | 442/224 |
| 3,219,502 A |   | 11/1965 | Willy | 156/79 |
| 3,540,977 A | * | 11/1970 | Schickedanz | 428/318.6 |
| 3,562,043 A | * | 2/1971 | Eddy | 156/79 |
| 3,575,754 A |   | 4/1971 | Duerden | 156/79 |
| 3,641,601 A |   | 2/1972 | Sieg | |
| 3,929,026 A |   | 12/1975 | Hofmann | |
| 4,042,556 A |   | 8/1977 | Yoshinaga | |
| 4,174,415 A | * | 11/1979 | Bethe | 428/90 |
| 4,369,081 A |   | 1/1983 | Curry et al. | |
| 4,841,684 A | * | 6/1989 | Hall, Jr. | 451/532 |
| 4,863,010 A |   | 9/1989 | Proksa et al. | |
| 4,956,396 A |   | 9/1990 | Kim et al. | |

(Continued)

FOREIGN PATENT DOCUMENTS

GB    1195948    5/1967

(Continued)

OTHER PUBLICATIONS

Machine translation of JP 56-072811.*

Primary Examiner — Bradley King
Assistant Examiner — Mahbubur Rashid
(74) Attorney, Agent, or Firm — Alvin T. Rockhill; Kathleen K. Bowen

(57) ABSTRACT

The present invention is directed to a treadmill belt with foamed cushion layer and method of making same. In one embodiment, the treadmill belt includes a fabric base layer and a foamed cushion layer foamed on and integral with the fabric base layer. The foamed cushion layer includes a thermoplastic composition and has a Shore A hardness of about 20 to about 80. In one example, the first foamed cushion layer is from about 0.05 inches to about 0.35 inches thick. The thermoplastic composition, prior to being foamed, includes about 1 part to about 5 parts of a foaming agent, e.g., a chemical foaming agent, based on 100 parts thermoplastic material, e.g., polyvinyl chloride. An outer wear layer is securely adhered on the foamed cushion layer to sandwich the foamed cushion layer between the fabric base layer and outer wear layer thereby defining the treadmill belt.

14 Claims, 2 Drawing Sheets

U.S. PATENT DOCUMENTS

| | | | |
|---|---|---|---|
| 5,071,697 A * | 12/1991 | Gulya et al. | 442/56 |
| 5,495,935 A * | 3/1996 | Zabron et al. | 198/847 |
| 5,832,852 A * | 11/1998 | Tornero et al. | 112/475.08 |
| 5,951,441 A | 9/1999 | Dalebout et al. | 482/54 |
| 6,180,210 B1 | 1/2001 | Debus | |
| 2004/0147373 A1* | 7/2004 | Haneburger | 482/54 |
| 2006/0205568 A1* | 9/2006 | Huang | 482/54 |
| 2006/0287147 A1 | 12/2006 | Kriesel | |
| 2007/0238835 A1* | 10/2007 | Chen | 525/240 |

FOREIGN PATENT DOCUMENTS

| | | | |
|---|---|---|---|
| JP | 56-072811 | * | 6/1981 |
| JP | 57113058 | | 7/1982 |
| JP | 4082572 | | 3/1992 |

* cited by examiner

TREADMILL BELT WITH FOAMED CUSHION LAYER AND METHOD OF MAKING

FIELD OF THE INVENTION

The present invention is directed to a treadmill belt with foamed cushion layer and method of making same.

BACKGROUND OF THE INVENTION

Treadmills have long been a favorite stationary means for exercising. A typical treadmill includes an elongated platform with multiple rollers. A continuous treadmill belt longitudinally encircles the platform resting on the rollers. Handrails extend upward from the front of the platform for providing stability to a user on the treadmill. While walking or running on the treadmill belt, the user can grip the handrails. The treadmill belt can be either motorized or rotate under the force of the user. In either case, the treadmill belt rotates on the rollers in a continuous circular fashion as the user runs or walks on the treadmill belt. This process continues until the user reaches a desired level of exercise.

Because typical treadmill platforms tend to provide a stiff, hard running surface which can become uncomfortable to the user over extended periods of running, some manufacturers have applied a resilient coating to the running surface, such as rubber or carpeting, to reduce foot impact. However, these surfaces have not provided the desired level of comfort or durability because the running surface tends to retain its inherent stiffness and insufficiently resists the impact and shearing forces that are applied to the belt as the user moves thereon. Attempts to solve these problems, such as by using a thicker belt to provide a more shock absorbent running surface, have not been successful. The thicker the belt, the more power that is required to drive the pulley. Thus, to keep motor size cost effective, it has been necessary to keep the belt relatively thin. While attempts have been made to produce thin, cushioned treadmill belts, effective belts that can be easily manufactured and withstand the required impact and stresses, yet, provide cushioning have not been produced.

Accordingly, there is a need for a treadmill belt with a cushioned layer that is easy to manufacture, not too thick, and provides the needed durability and shock absorbing characteristics to help prevent injury to the runner.

SUMMARY OF THE INVENTION

The present invention is directed to a treadmill belt with foamed cushion layer and method of making same.

In one embodiment, the treadmill belt includes a fabric base layer and a foamed cushion layer foamed on and integral with the fabric base layer. The foamed cushion layer includes a thermoplastic composition and has a Shore A hardness of about 20 to about 80. In one example, the foamed cushion layer is from about 0.05 inches to about 0.35 inches thick. The thermoplastic composition, prior to being foamed, includes about 1 part to about 5 parts of a foaming agent, e.g., a chemical foaming agent, based on 100 parts thermoplastic material, e.g., polyvinyl chloride. An outer wear layer is securely adhered on the foamed cushion layer so as to sandwich the foamed cushion layer between the fabric base layer and outer wear layer thereby defining the treadmill belt with foamed cushion layer.

The treadmill belt, in one embodiment, can be formed by applying at least one layer of an unfoamed thermoplastic composition on a fabric base layer. In one example, the unfoamed thermoplastic composition includes a chemical foaming agent in an amount of about 1 part to about 5 parts chemical foaming agent, such as an azo compound, based on 100 parts thermoplastic material, such as polyvinyl chloride. Next, the unfoamed thermoplastic composition is foamed, such as by being heated, to define a foamed cushion layer which has a Shore A hardness of about 20 to about 80. Then, an outer wear layer is applied on the foamed cushion layer to define the treadmill belt with foamed cushion layer.

By virtue of the foregoing, there is provided a treadmill belt with foamed cushion layer that is easy to manufacture, not too thick, and provides the needed durability and shock absorbing characteristics to help prevent injury to the runner.

BRIEF DESCRIPTION OF THE DRAWINGS

The accompanying drawings, which are incorporated in and constitute a part of this specification, illustrate embodiments of the invention and, together with the general description of the invention given above, and detailed description given below, serve to explain the invention.

DETAILED DESCRIPTION

Figure 1:
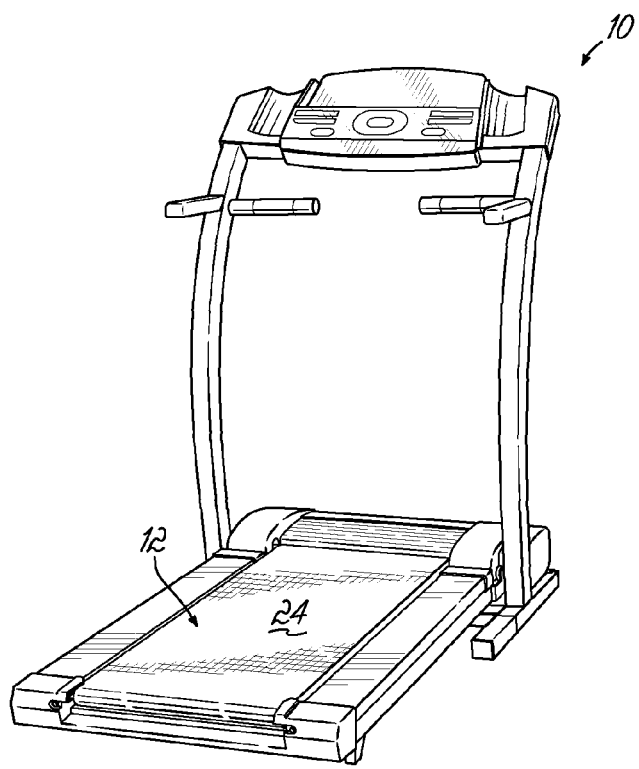
FIG. 1 is a perspective view of a treadmill having a treadmill belt with foamed cushion layer.

FIG. 1 shows a treadmill 10 including a treadmill belt 12 that is continuous and rotatably mounted on rollers (not shown). The treadmill belt 12 can be motorized for automatic rotation or rotated by force supplied by the user. As the user walks or runs, the treadmill belt 12 rotates, thereby allowing the user to continue to run or walk thereon while maintaining a relatively stationary position.

Figure 2:
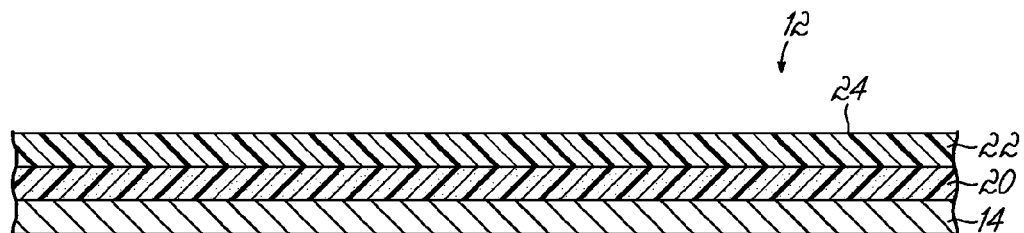
FIG. 2 is a cross-sectional view of a length of the treadmill belt of FIG. 1.

With reference to FIG. 2, the treadmill belt 12, in one embodiment, includes a fabric base layer 14 that defines an interior surface 16 of the treadmill belt 12. The treadmill belt 12 further includes a foamed cushion layer 20 foamed on and integral with the fabric base layer 14, as further explained below. The foamed cushion layer 20 includes a foamed thermoplastic composition. While shown in FIG. 2 as being foamed directly onto and integral with fabric base layer 14, it is understood that other conventional layers, as known in the art, may be situated between the foamed cushion layer 20 and fabric base layer 14.

An outer wear layer 22, which defines a running surface 24 for the user, is securely adhered, such as by heat bonding, on the foamed cushion layer 20 so as to sandwich the foamed cushion layer 20 between the fabric base layer 14 and outer wear layer 22, thereby defining the treadmill belt 12. And, while shown in FIG. 2 as being securely adhered directly to the foamed cushion layer 20, it is understood that other conventional layers, as known in the art, may be situated between the outer wear layer 22 and the foamed cushion layer 20.

The fabric base layer 14 of the treadmill belt 12 rides on and presses against the rollers during rotation of the treadmill belt 12. In addition, the fabric base layer 14 can withstand the localized forces applied to the treadmill belt 12 as a result of a user running thereon. Those forces can be as high as 400-600 pounds per square inch. The material for the fabric base layer 14 is substantially non-extendable so as to prevent the treadmill belt 12 from slipping on the rollers. The fabric base layer 14 also may include either a one-ply or multi-ply sheet of woven fabric. Such woven fabric includes synthetic and/or natural fibers, such as polyester, nylon, rayon, and/or cotton. The fibers may be provided as mono- or multi-filament or spun yarns. In one example, the woven fabric includes a multi-filament polyester.

The foamed thermoplastic composition of the foamed cushion layer 20 is resiliently compressible. The foamed thermoplastic composition layer also has a Shore A hardness of about 20 to about 80 so as to provide a desirable flexibility. In another example, the foamed thermoplastic composition has a Shore A hardness of about 30 to about 50.

Prior to being foamed, the thermoplastic composition, also referred to herein as the unfoamed thermoplastic composition, includes 100 parts thermoplastic material and about 1 part to about 5 parts of a foaming, or blowing, agent based on 100 parts thermoplastic material. In one example, about 3 parts of foaming agent based on 100 parts thermoplastic material is included in the unfoamed thermoplastic composition. In addition, plasticizers and other typical additives, such as stabilizers, oils, foaming catalysts, and the like, generally may be included in conventional amounts.

The thermoplastic material can include, for example, polyvinyl chloride, ethylene vinyl acetate, and/or polystyrene. In one example, the thermoplastic material is polyvinyl chloride. One such suitable polyvinyl chloride is 68GP, which is a polyvinyl chloride dispersion resin available from Petco of Bogota, Colombia.

Foaming, or blowing, agents may be classified as physical and chemical foaming agents. Physical foaming agents do not undergo chemical changes during processing and typically are provided in the form of compressed gas, e.g., nitrogen or carbon dioxide gas. Physical foaming agents create cellular structures in the unfoamed thermoplastic composition when introduced into the unfoamed thermoplastic composition thereby foaming the unfoamed composition.

Chemical foaming agents are mainly solids. These solids generally are mixed with the thermoplastic material. The chemical foaming agents commonly release gases such as nitrogen, carbon dioxide, carbon monoxide, or ammonia when heated. Thus, the unfoamed thermoplastic composition can be heated to the activation temperature of the chemical foaming agent to activate the foaming agent. The activated chemical foaming agent releases gases upon decomposition to create cellular structures in the unfoamed thermoplastic composition, thereby foaming the unfoamed composition. The chemical foaming agent can include an azo compound, such as azodicarbonamide, a hydrazine compound, a carbazide, a tetrazole, a nitroso compound, and/or a carbonate, such as sodium bicarbonate. In one example, the chemical foaming agent is an azo compound, e.g., azodicarbonamide. One such suitable azodicarbonamide foaming agent is Celogen® AZ available from Chemtura Corporation of Middlebury, Conn.

The plasticizer can include, for example, dialkyl adipate esters, dialkyl azelates, glycol dibenzoate esters, epoxy derivatives including epoxidized soybean oil, epoxidized tall oil and epoxy resins, glycollates such as butyl phthalyl, butyl glycollate, mellitates such as trialkyl trimellitates, phenoxy compounds, phosphate esters including triaryl, trialkyl and alkyl-aryl combinations, derivatives of ortho-phthalic acid such as dialkyl and alkyl benzyl o-phthalates, polyesters and dibasic acids with glycols (e.g., adipic, azelaic and phthalic acids with various glycols terminated with a monofunctional compound), and pentaerythritol derivatives and sulfonamides. In one example, the plasticizer is diisononyl phthalate.

In one non-limiting example, the unfoamed thermoplastic composition includes the following:

| Ingredient | phr |
| --- | --- |
| Polyvinyl chloride[1] | 100 |
| Plasticizer[2] | 80 |
| Calcium stabilizer[3] | 2 |
| Epoxidized soybean oil[4] | 5 |
| Chemical Foaming agent[5] | 3 |

[1]68GP, which is a polyvinyl chloride dispersion resin available from Petco of Bogota, Colombia.
[2]Diisononyl phthalate (DINP), which is available from BASF of Ludwigshafen, Germany.
[3]Available from Ferro of Cleveland, Ohio.
[4]Available from Ferro of Cleveland, Ohio
[5]Celogen ® AZ, which is an azodicarbonamide available from Chemtura Corporation of Middlebury, Connecticut The foamed cushion layer 20 can be from about 0.05 inches to about 0.35 inches thick. In one example, the foamed cushion layer 20 is about 0.180 inches thick.

The outer wear layer 22 defines the running surface 24 on which the user walks or runs and has a desirable durability. The outer wear layer 22 can include a thermoplastic material or a rubber material. In one example, the thermoplastic material is a thermoplastic elastomer. In another example, the thermoplastic material includes polyvinyl chloride or polyurethane. The rubber material can include conventional natural and/or synthetic rubbers known in the art.

In an alternate embodiment, a bottom surface layer (not shown) may be secured to the underside of the fabric base layer 14 of the treadmill belt 12. The bottom layer can include a thermoplastic material, which provides a low coefficient of friction. In one example, the thermoplastic material includes polyvinyl chloride, polyurethane, or a polyamide, such as nylon.

The total thickness of the treadmill belt 12 is from about 0.100 inches to about 0.400 inches. In one example, the total thickness of the treadmill belt 12 is about 0.200 inches.

Figure 2A:
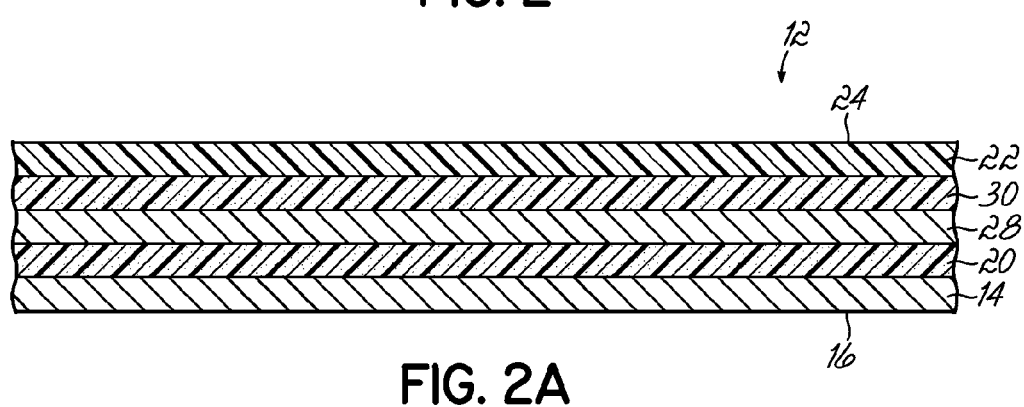
FIG. 2A is a cross-sectional view of an alternate embodiment of the treadmill belt of FIG. 2.

Another embodiment of the treadmill belt 12 is best shown in FIG. 2A. In this embodiment, a fabric intermediate layer 28 is securely adhered directly to foamed cushion layer 20, such as upon foaming or via heat bonding, so as to sandwich the foamed cushion layer 20 between the fabric base layer 14 and fabric intermediate layer 28. Like foamed cushion layer 20, a second foamed cushion layer 30, which includes a thermoplastic composition, is foamed directly onto and integral with the fabric intermediate layer 28, as explained further below. It should be understood that additional intermediate and foamed cushion layers 28 and 20, 30 may be similarly alternately layered within treadmill belt 12, as desired, thereby providing additional fabric layers.

Next, the outer wear layer 22 is securely adhered, such as by heat bonding, directly to the second foamed cushion layer 30 so as to sandwich the second foamed cushion layer 30 between the fabric intermediate layer 28 and outer wear layer 22, thereby defining the treadmill belt 12 with first and second foamed cushion layers 20, 30. In an alternate embodiment, foamed cushion layer 20 may be replaced with an unfoamed conventional layer (not shown), such unfoamed layer can include a conventional thermoplastic layer. The thermoplastic layer can include a thermoplastic composition, such as a polyvinyl chloride composition. Accordingly, for belts 12 with multiple fabric layers, as shown in FIG. 2A, it should be understood that either standard thermoplastic layers or foamed cushion layers can be provided between the fabric layers 14, 28, with at least one of those layers being a foamed cushion layer. In one example, the foamed cushion layer is closest to the outer wear layer 22. Also, as mentioned above, other conventional layers, as known in the art, may be situated between the various layers 14, 20, 22, 28, and 30.

Like the fabric base layer 14, the material for the fabric intermediate layer 28 is substantially non-extendable. In one embodiment, the fabric intermediate layer 28 includes a one-ply or multi-ply sheet of woven fabric. The woven fabric includes synthetic and/or natural fibers, such as polyester, nylon, rayon, and/or cotton. The fibers may be provided as mono- or multi-filament or spun yarns. In one example, the woven fabric includes a multi-filament polyester. The type of material used for the fabric intermediate layer 28 and the fabric base layer 14 is generally interchangeable and may be the same or different.

The foamed thermoplastic composition of the second foamed cushion layer 30 is the same as that described above for foamed cushion layer 20. The unfoamed thermoplastic compositions for the second foamed cushion layer 30 and foamed cushion layer 20 may be the same or different in the treadmill belt 12.

Figure 3:
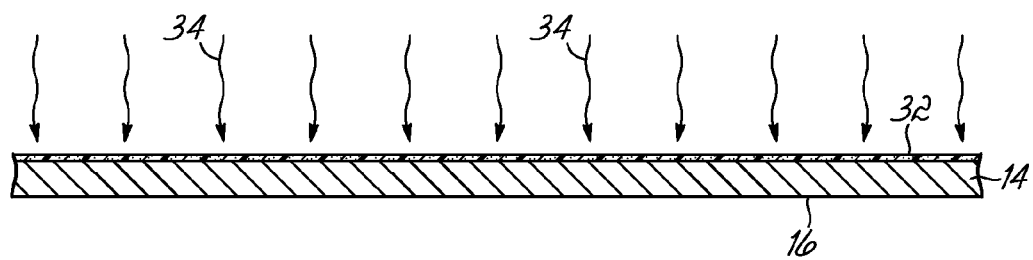
FIGS. 3-5 illustrate a process of making the treadmill belt of FIG. 1.
Figure 4:
Figure 5:
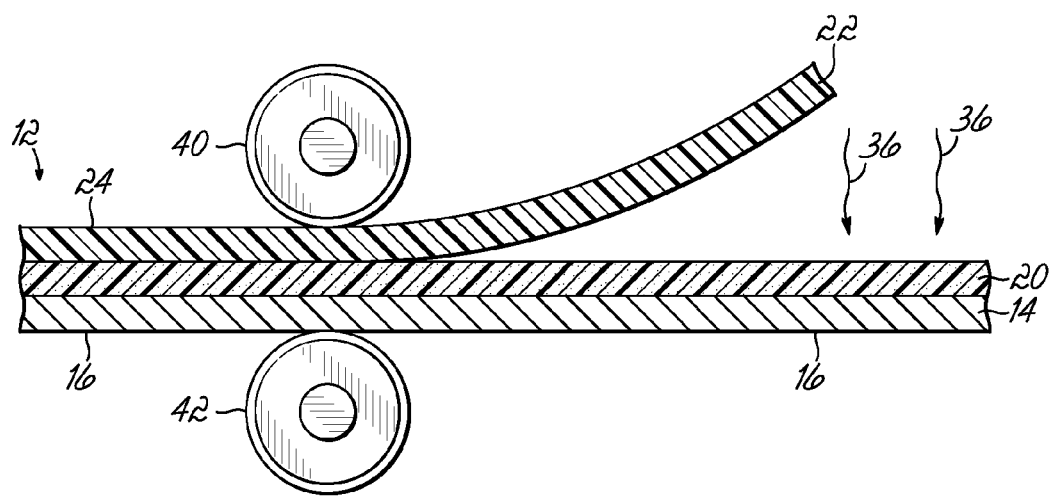

FIGS. 3-5 illustrate an embodiment of a method of making the treadmill belt 12 of FIG. 2. With specific reference to FIG. 3, the method includes applying a layer 32 of the unfoamed thermoplastic composition to the fabric base layer 14 using techniques known in the art, e.g., via extrusion techniques. In another example, multiple layers of the unfoamed thermoplastic composition can be applied to the base fabric layer 12. Next, the unfoamed thermoplastic composition is foamed using a foaming agent to create cellular structures in the unfoamed thermoplastic composition thereby defining the foamed cushion layer 20. Such foaming may occur by way of a physical or chemical foaming agent as is known in the art. When a chemical foaming agent is used, heating to the activation temperature of the chemical foaming agent takes place. As shown in FIG. 4, the resulting foamed cushion layer 20 is integral with the fabric base layer 14.

By way of example, the unfoamed thermoplastic composition can include the polyvinyl chloride composition of Table 1. That unfoamed composition, which includes an azidocarbamide foaming agent, is heated, as depicted by wavy lines 34, e.g., between about 300° F. to about 450° F., to activate and decompose the foaming agent. The decomposing agent releases nitrogen gas to create cellular structures in the unfoamed composition thereby foaming the polyvinyl chloride compound. As discussed above, the resulting foamed cushion layer 20 has a Shore A hardness of about 20 to about 80 and is resiliently compressible and flexible. In addition, the integral fabric base layer 14, in one example, is a one-ply woven sheet of multifilament polyester.

With reference now to FIG. 5, after foaming of the unfoamed thermoplastic composition, the integral foamed cushion layer 20 and fabric base layer 14 are reheated, as depicted by wavy lines 36, to a temperature sufficient to heat bond and, thus, securely adhere the outer wear layer 22 to the foamed cushion layer 20. In one example, the outer wear layer 22 includes polyvinyl chloride and the foamed cushion layer 20 is reheated to about 300° F. to about 450° F. so as to melt the upper surface of the composition. The outer wear layer 22 then is applied to the foamed cushion layer 20, such as by being pressed between rollers 40 and 42 concurrently with the integral foamed cushion layer 20 and fabric base layer 14. The resulting treadmill belt 12 is cooled to securely adhere the outer wear layer 22 to the foamed cushion layer 20 and then eventually cut to desired lengths for use with treadmill 10. Prior to use, it will be understood that opposing ends of cut lengths of the treadmill belt 12 must be combined together by techniques known in the art, such as finger splicing or bias splicing, or step splicing or skive splicing for two or more plies, and heating together, to provide the continuous treadmill belt 12 of FIG. 1.

In another embodiment, a method of making the treadmill belt 12 of FIG. 2A includes further applying, such as by placing, the fabric intermediate layer 28 on the unfoamed thermoplastic composition. Next, like layer 32, one or more layers of the second unfoamed thermoplastic composition is applied to the fabric intermediate layer 28. Then, the first and second unfoamed thermoplastic compositions are foamed by way of a physical or chemical foaming agent, as discussed above, to define first and second foamed cushion layers 20, 30 which have a Shore A hardness of about 20 to about 80.

Alternatively, the fabric intermediate layer 28 is applied to foamed cushion layer 20 then layer 38 of the second unfoamed thermoplastic composition is applied to the fabric intermediate layer 28. Next, the second unfoamed thermoplastic composition is foamed to define the second foamed cushion layer 30 which has a Shore A hardness of about 20 to about 80.

By way of example, the second unfoamed thermoplastic composition can include the polyvinyl chloride composition of Table 1. As discussed above, the azidocarbamide chemical foaming agent is heated to between about 300° F. to about 450° F. to decompose the foaming agent and foam the composition. In addition, the fabric base and intermediate layers 14, 28 may be one-ply woven sheets of multifilament polyester.

Finally, the outer wear layer 22 is applied to the second foamed cushion layer 30, as explained above, to define the treadmill belt 12 of FIG. 2A with first and second foamed cushion layers 20, 30. In one example, the outer wear layer 22 includes polyvinyl chloride. The treadmill belt 12 subsequently may be cut to length and spliced together.

Accordingly, there is provided a treadmill belt with a cushioned layer that is easy to manufacture, not too thick, and provides the needed durability and shock absorbing characteristics to help prevent injury to the user.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. For example, rather than use the treadmill belt on a treadmill, the treadmill belt may be used in the light conveyor belt industry as a conveyor belt. The invention in its broader aspects is therefore not limited to the specific details, representative product and method and illustrative examples shown and described. Accordingly, departures may be made from such details without departing from the scope of the general inventive concept.

What is claimed is:

1. A method of making a treadmill belt comprising:
applying at least one layer of a first unfoamed thermoplastic composition on and integral with a substantially non-extendable fabric base layer;
foaming the first unfoamed thermoplastic composition to define a first foamed cushion layer, wherein the first unfoamed thermoplastic composition is a polyvinyl chloride composition that includes 100 parts polyvinyl chloride and 1 part to 5 parts of a foaming agent per 100 parts polyvinyl chloride, wherein the first foamed cushion layer has a Shore A hardness of about 20 to about 80, and wherein the first foamed cushion layer is from 0.05 inches to 0.35 inches thick;

applying an outer wear layer on and integral with the foamed cushion layer to define the treadmill belt with first foamed cushion layer, wherein the outer wear layer is comprised of natural rubber or a synthetic rubber; and securing a bottom surface layer to the underside of the fabric base layer, wherein the bottom surface layer is comprised of a thermoplastic material selected from the group consisting of polyvinyl chloride and polyurethane; wherein said treadmill belt consists solely of (a) the substantially non-extendable fabric base layer, (b) the a first foamed cushion layer, (c) the outer wear layer, and (d) the bottom surface layer.

2. The method of claim 1 wherein foaming the first unfoamed thermoplastic composition comprises heating the first unfoamed thermoplastic composition to foam the first unfoamed thermoplastic composition and define the first foamed cushion layer.

3. The method of claim 1 wherein the fabric base layer is a one-ply woven sheet of synthetic and/or natural material, and the outer wear layer includes a thermoplastic material or a rubber material.

4. A method of making a treadmill belt comprising:

applying at least one layer of a first unfoamed thermoplastic composition onto a substantially non-extendable woven fabric base layer, the first unfoamed thermoplastic composition having a first chemical foaming agent in an amount of 1 part to 5 parts first chemical foaming agent based on 100 parts thermoplastic material;

activating the first chemical foaming agent to foam the first unfoamed thermoplastic composition to define a first foamed cushion layer which has a Shore A hardness of 20 to 80, wherein the first foamed cushion layer is from 0.05 inches to 0.35 inches thick; and applying an outer wear layer onto the first foamed cushion layer to define the treadmill belt with first foamed cushion layer, wherein the outer wear layer is comprised of natural rubber or a synthetic rubber; and securing a bottom surface layer to the underside of the fabric base layer, wherein the bottom surface layer is comprised of a thermoplastic material selected from the group consisting of polyvinyl chloride and polyurethane; wherein said treadmill belt consists solely of (a) the substantially non-extendable fabric base layer, (b) the a first foamed cushion layer, (c) the outer wear layer, and (d) the bottom surface layer.

5. The method of claim 4 wherein the first unfoamed thermoplastic composition is an unfoamed polyvinyl chloride having the first chemical foaming agent.

6. The method of claim 5 wherein the unfoamed polyvinyl chloride based composition includes 100 parts polyvinyl chloride, 1 part to 5 parts first chemical foaming agent based on 100 parts polyvinyl chloride, and a plasticizer.

7. The method of claim 4 wherein the fabric base layer is a one-ply woven sheet of synthetic and/or natural material, and the outer wear layer includes a thermoplastic material or a rubber material.

8. A treadmill belt comprising;

a substantially non-extendable fabric base layer;

a first foamed cushion layer foamed on and integral with the fabric base layer, the first foamed cushion layer including a first foamed thermoplastic composition and having a Shore A hardness of 20 to 80, wherein the first foamed cushion layer is from 0.05 inches to 0.35 inches thick, the first thermoplastic composition, prior to being foamed, including 1 part to 5 parts of a foaming agent based on 100 parts thermoplastic material; and an outer wear layer securely adhered on and integral with the first foamed cushion layer so as to sandwich the first foamed cushion layer between the fabric base layer and outer wear layer thereby defining the treadmill belt with first foamed cushion layer, wherein the outer wear layer is comprised of natural rubber or a synthetic rubber; and a bottom surface layer which is adhered on and integral with the underside of the fabric base layer, wherein the bottom surface layer is comprised of a thermoplastic material selected from the group consisting of polyvinyl chloride and polyurethane; wherein said tread mill belt consists solely of (a) the substantially non-extendable fabric base layer, (b) the a first foamed cushion layer, (c) the outer wear layer, and (d) the bottom surface layer.

9. The treadmill belt of claim 8 wherein the bottom surface layer is comprised of polyurethane.

10. The treadmill belt of claim 8 wherein the thermoplastic material is a polyvinyl chloride and the foaming agent is a chemical foaming agent.

11. The treadmill belt of claim 8 wherein the fabric base layer is a one-ply woven sheet of synthetic and/or natural material, and the outer wear layer includes a thermoplastic material or a rubber material.

12. The treadmill belt of claim 8 wherein the first foamed cushion layer is foamed directly on and integral with the fabric base layer, and the outer wear layer is securely adhered directly on the first foamed cushion layer so as to sandwich the first foamed cushion layer between the fabric base layer and outer wear layer thereby defining the treadmill belt with the first foamed cushion layer.

13. The treadmill belt of claim 8 wherein the first foamed cushion layer extents to the outer edges of the treadmill belt, and wherein the fabric base layer does not come in contact with the outer wear layer.

14. The treadmill belt of claim 8 wherein the first foamed cushion layer is from 0.18 inches to 0.35 inches thick.

* * * * *